(12) United States Patent
Taylor et al.

(10) Patent No.: US 8,782,260 B2
(45) Date of Patent: *Jul. 15, 2014

(54) NETWORK ACCESS CONTROL SYSTEM AND METHOD USING ADAPTIVE PROXIES

(75) Inventors: Kevin R. Taylor, Ellicott City, MD (US); Ganesh Murugesan, Silver Spring, MD (US); Homayoon Tajalli, Ellicott City, MD (US)

(73) Assignee: McAfee, Inc., Santa Clara, CA (US)

( * ) Notice: Subject to any disclaimer, the term of this patent is extended or adjusted under 35 U.S.C. 154(b) by 903 days.

This patent is subject to a terminal disclaimer.

(21) Appl. No.: 11/855,954

(22) Filed: Sep. 14, 2007

(65) Prior Publication Data
US 2013/0246627 A1  Sep. 19, 2013

Related U.S. Application Data

(63) Continuation of application No. 10/756,687, filed on Jan. 12, 2004, now Pat. No. 7,391,770, which is a continuation of application No. 09/414,711, filed on Oct. 8, 1999, now Pat. No. 6,728,885.

(60) Provisional application No. 60/103,837, filed on Oct. 9, 1998.

(51) Int. Cl.
| | |
|---|---|
| *G06F 15/16* | (2006.01) |
| *H04L 12/28* | (2006.01) |
| *H04L 12/56* | (2006.01) |
| *G06F 17/00* | (2006.01) |
| *H04L 29/06* | (2006.01) |
| *G06F 9/00* | (2006.01) |

(52) U.S. Cl.
CPC ......... *H04L 63/0263* (2013.01); *H04L 63/0281* (2013.01)
USPC ............... 709/229; 709/227; 370/389; 726/1; 726/11; 726/13

(58) Field of Classification Search
CPC ............ H04L 63/0263; H04L 63/0227; H04L 63/0281
USPC .......... 709/203, 227, 229; 370/389, 401, 400, 370/428, 392, 390, 351, 356, 352; 726/1, 726/11, 13
See application file for complete search history.

(56) References Cited

U.S. PATENT DOCUMENTS

| | | | |
|---|---|---|---|
| 5,606,668 A | 2/1997 | Shwed | |
| 5,848,233 A * | 12/1998 | Radia et al. | 726/13 |

(Continued)

OTHER PUBLICATIONS

Windows Sockets 2 Application Programming Interface, Revision 2.2.2, pp. 36-59 [online], Aug. 7, 1997 [retrieved on Sep. 30, 2009]. Retrieved from the Internet:<URL:ftp://ftp.microsoft.com/bussys/winsock/winsock2/WSAPI22.DOC>.*

*Primary Examiner* — Rupal Dharia
*Assistant Examiner* — Wing Ma
(74) *Attorney, Agent, or Firm* — Patent Capital Group

(57) ABSTRACT

A method, system and computer program for providing multilevel security to a computer network. The method comprises the step of receiving a first communication packet on at least one network interface port from an outside network. The method further includes the steps of filtering the first packet in one of at least two levels of security comprising a first level of security which examines the content information of the packet and a second level of security which examines the first packet excluding the content information of the packet. The system includes a first packet filter configured to filter its input packets by examining content information of its packets and a second packet filter configured to filter its input packets by examining the header information without examining the content information of its packets. The system further includes a third filter which is configured to forward a number of packets to one of the first and second filters, thereby providing security to the computer network. The computer program includes a first module located in an application layer, a second module located in a network layer, and a third module located in a kernel space and configured to examine a number of packets received by the computer network from at least one outside network and to forward the number of packets to one of the first and second modules after examining the number of packets.

18 Claims, 7 Drawing Sheets

(56) References Cited

U.S. PATENT DOCUMENTS

| | | | |
|---|---|---|---|
| 5,884,025 A | 3/1999 | Baehr et al. | |
| 5,898,830 A | 4/1999 | Wesinger et al. | |
| 5,950,195 A * | 9/1999 | Stockwell et al. | 707/4 |
| 5,968,176 A | 10/1999 | Nessett et al. | |
| 5,987,610 A | 11/1999 | Franczek et al. | |
| 6,000,628 A * | 12/1999 | Lorraine | 239/87 |
| 6,006,268 A * | 12/1999 | Coile et al. | 709/227 |
| 6,073,142 A | 6/2000 | Geiger et al. | |
| 6,092,191 A | 7/2000 | Shimbo et al. | |
| 6,098,172 A * | 8/2000 | Coss et al. | 726/11 |
| 6,128,298 A | 10/2000 | Wootton et al. | |
| 6,131,163 A * | 10/2000 | Wiegel | 726/12 |
| 6,148,336 A * | 11/2000 | Thomas et al. | 709/224 |
| 6,170,012 B1 * | 1/2001 | Coss et al. | 709/229 |
| 6,243,815 B1 * | 6/2001 | Antur et al. | 726/11 |
| 6,263,444 B1 * | 7/2001 | Fujita | 726/25 |
| 6,275,942 B1 | 8/2001 | Bernhard et al. | |
| 6,304,973 B1 * | 10/2001 | Williams | 726/3 |
| 6,345,299 B2 | 2/2002 | Segal | |
| 6,400,707 B1 | 6/2002 | Baum et al. | |
| 6,408,336 B1 * | 6/2002 | Schneider et al. | 709/229 |
| 6,460,050 B1 | 10/2002 | Pace et al. | |
| 6,473,406 B1 * | 10/2002 | Coile et al. | 370/248 |
| 6,484,261 B1 * | 11/2002 | Wiegel | 726/11 |
| 6,535,509 B2 * | 3/2003 | Amicangioli | 370/389 |
| 6,578,151 B1 * | 6/2003 | Nilsen | 726/11 |
| 6,700,891 B1 * | 3/2004 | Wong | 370/401 |
| 7,058,976 B1 | 6/2006 | Dark | |
| 7,073,196 B1 * | 7/2006 | Dowd et al. | 726/14 |
| 7,136,359 B1 | 11/2006 | Coile et al. | 370/248 |
| 7,391,770 B1 | 6/2008 | Taylor et al. | 370/389 |
| 7,506,155 B1 | 3/2009 | Stewart et al. | |
| 2003/0005331 A1 * | 1/2003 | Williams | 713/201 |

* cited by examiner

NETWORK ACCESS CONTROL SYSTEM AND METHOD USING ADAPTIVE PROXIES

RELATED APPLICATION(S)

The present application is a continuation of a patent application filed Jan. 12, 2004 under Ser. No. 10/756,687 now U.S. Pat. No. 7,391,770 which is, in turn, a continuation of an application filed Oct. 8, 1999 under Ser. No. 09/414,711, now U.S. Pat. No. 6,728,885, which, in turn, claims the benefit of a provisional patent application filed Oct. 9, 1998 under Ser. No. 60/103,837, all of which are incorporated herein by reference.

FIELD OF INVENTION

This invention relates to providing security in communication networks. In particular, the invention relates to firewall technology in packet switched networks for adaptively providing a plurality of security levels.

BACKGROUND OF THE INVENTION

Referring to FIG. 1, a typical firewall 101 is placed between a Local Area Network (LAN) 103 and outside networks 111, 115. LAN 103 may include a plurality of internal hosts 105, 107, 109. Outside networks 111 can be networked through the Internet 117. Outside network 115 may also include its own firewall 117. Internal hosts 105, 107, 109 and remote hosts 119, 121 are computers, e.g., personal computers (PC) or computer workstations. Firewall 101 includes a combination of computer hardware and software components configured to protect LAN 103, i.e., preventing unwanted intrusions from outside networks 111, 115.

In order to exchange information, e.g., sending a message from remote host 119 to internal host 105, a connection 125 is established by sending a plurality of packets therebetween. A packet is a basic message unit routed between a source computer and a destination computer, e.g., remote host 119 and internal host 105, respectively, in a packet-switched network depicted in FIG. 1. For example, when a file, e.g., an e-mail message, HTML file, or other similar message, is sent from a source computer to a destination computer, the file is broken into a plurality of packets. (Here, HTML, Hypertext Markup Language, is a set of "markup" symbols or codes, which instructs a Web browser how to display a Web page's words and images.)

More specifically, a Transport Control Protocol (TCP) module of a TCP/IP layer in a source computer divides the file into packets of an efficient size for transmitting over the network. Each packet includes header information, e.g., a destination address and a source address, and content information, i.e., the broken up message file. Further, the plurality of packets from the file includes a plurality of connection control packets and data transfer packets. The connection control packets include at least one connection establishing packet, e.g., a SYN packet, and at least one connection disconnection packet, e.g., RST, FIN, FIN-ACK packets. The data transfer packets include the pieces of the broken up file. Individual packets for a given file may travel different routes through the packet switching network. When the packets from one file have all arrived at their destination computer, they are reassembled into the original file by a TCP module in the destination computer.

Here, the TCP module is a communication protocol used along with the Internet Protocol (IP) to send data in the form of packets between a source and destination computers. While the IP module performs the actual delivery of the data, the TCP module keeps track of the individual packets that a file is divided into for efficient routing through the Internet.

OSI (Open Systems Interconnection) is briefly described here to provide the context in which the present invention is discussed later. OSI is a reference model for the layer of common functions in a communications system. Although many existing hardware and software products have been developed on a slightly different model, the OSI model is often used as a guideline when new products are designed and serves as a common reference for understanding any particular design or comparing it with others.

OSI includes seven layers:

The application layer (layer 7) is a layer at which a user interacts with a computer to view messages or send data requests or responses.

The presentation layer (layer 6) is a layer, usually part of an operating system, that converts incoming and outgoing data from one presentation format to another (e.g., converting a text stream into a popup window with a newly arrived text string).

The session layer (layer 5) manages the establishment of a continuing series of requests and responses between the applications at each end of a communication connection.

The transport layer (layer 4) manages the end-to-end control (e.g., determining whether all packets have arrived) and error-checking.

The network layer (layer 3) handles the routing of the data (sending it in the right direction to the right destination on outgoing transmissions and receiving incoming transmissions at the packet level).

The link (or data-link) layer (layer 2) provides error control and synchronization for the physical level and does bit-stuffing for strings of 1's in excess of 5.

The physical layer (layer 1) conveys the bit stream through the network at the electrical and mechanical level.

Referring back to FIG. 1, the basic task of firewall 101 is to separate internal network 103 from outside networks 117, 115 and enforce security policies with a set of rules. The most common firewall features include: securing internal network 103 access with a perimeter defense, controlling all connections into and out of internal network 103, filtering packets according to previously defined rules, "authenticating" or making sure users and applications are permitted to access resources, logging of activities, and actively notifying the appropriate people when suspicious events occur.

Conventional firewalls include only one of a packet filter, an application proxy and a stateful inspection.

A packet filter examines each incoming packet and decides what actions to take by checking against a table of access control rules. The packet filter, in its simpler embodiments, examines the header information of each incoming packet and makes pass/fail decisions based on their source and destination addresses. A weakness of such a firewall is that the content information of the packets is unknown to the firewall. More specifically, because packet filters perform their checking at the network access layer, there is no real knowledge of application level vulnerabilities. As a result, direct connections are allowed between a source and destination computers through firewall 101, exposing internal hosts 105, 107, 109 to direct attacks.

An application proxy does not allow direct contact between a 'trusted' and 'untrusted' networks. Each of the packets passing through this type of firewall is examined at the application layer—meaning the application proxies understand the destination and contents of packets. Such a firewall, for example, distinguishes between "FTP Put" and "Get" commands. A typical application proxy includes a built-in proxy function also known as a transparency function. The transparency function replaces the IP address of a host on the internal protected network with its own IP address for all traffic passing through. The transparency function provides added security, because it hides the addresses of internal hosts. This makes it more difficult for hackers on the outside to target specific devices inside such a firewall. For this higher security, however, the application proxy requires large amounts of processing power and a corresponding loss of performance.

Finally, a stateful packet filter examines packets without examining the packets as well as that of an application proxy. After a packet filter firewall or stateful inspection firewall has decided to allow a connection to be made, it allows data to travel directly between the networks without further inspection. Once a session is opened, the nature of the session can be changed without being detected. This allows for more speed, but also creates potential security risks as well. Again, making internal hosts 105, 107, 109 vulnerable to attacks from outside.

Accordingly, there exists a need for a firewall method which makes it possible to dynamically select the best procedures from existing firewall methods to achieve the required level of security while meeting performance constraints.

Further, the definitions of network communication terms and phases can be found in Andrew S. Tannenbaum, "Computer Networks" $2^{nd}$ ed., (1989), the contents of which are herein incorporated by reference. Information on network programming can also be found in W. Richard Stevens, "Unix Network Programming" (1990), the contents of which are herein incorporated by reference.

SUMMARY OF THE INVENTION

The firewall of the present invention combines the advantages provided in the conventional firewall technologies described above while eliminating short comings thereof. In other words, the firewall of the present invention is just as secure as a proxy firewall, but it is more flexible and efficient.

More specifically, the firewall of the present invention is provided between an internal computer network to be protected by the firewall and at least one outside network. The firewall includes a dynamic packet filter which communicates with a proxy. The proxy registers with the dynamic packet filter for notifications of request to establish new data communication connections through physical connections between the internal and outside computer networks. When a connection establishing request is received, in the form of a SYN packet, the dynamic packet filter notifies the proxy and provides attribute information thereto. The attribute information includes the source and destination addresses and the physical connection on which the packet was received.

In order to determine whether to allow the requested data communication connection, the proxy compares the attribute information with rules in a configuration information file. The rules in the configuration information file are entered by a user to set forth whether to allow data communication connections for certain physical connections. If the rule is to allow the data communication connection and forward the packets at the packet level, the dynamic packet filter creates a connection rule so as to apply the connection rule to packets having the same attribute information. Subsequent packets received with the same attribute information are then automatically forwarded without consulting the proxy. Once the connection terminates, the connection rule is removed and the proxy is notified. However, if the decision is to absorb, the dynamic packet filter sends the packets up a TCP/IP stack in the firewall, where they will be accepted by the proxy.

In other words, the proxy acts as the server to the incoming connection and initiates a new connection, acting as a client, to the ultimate destination. In between, the necessary application-level filtering is performed.

An added benefit of the present invention, beyond the performance improvement, is the flexibility it gives its users. Within the adaptive proxy model, a firewall can be configured to follow more or less stringent security rules, fine-tuning performance even more.

DETAILED DESCRIPTION

Figure 1:
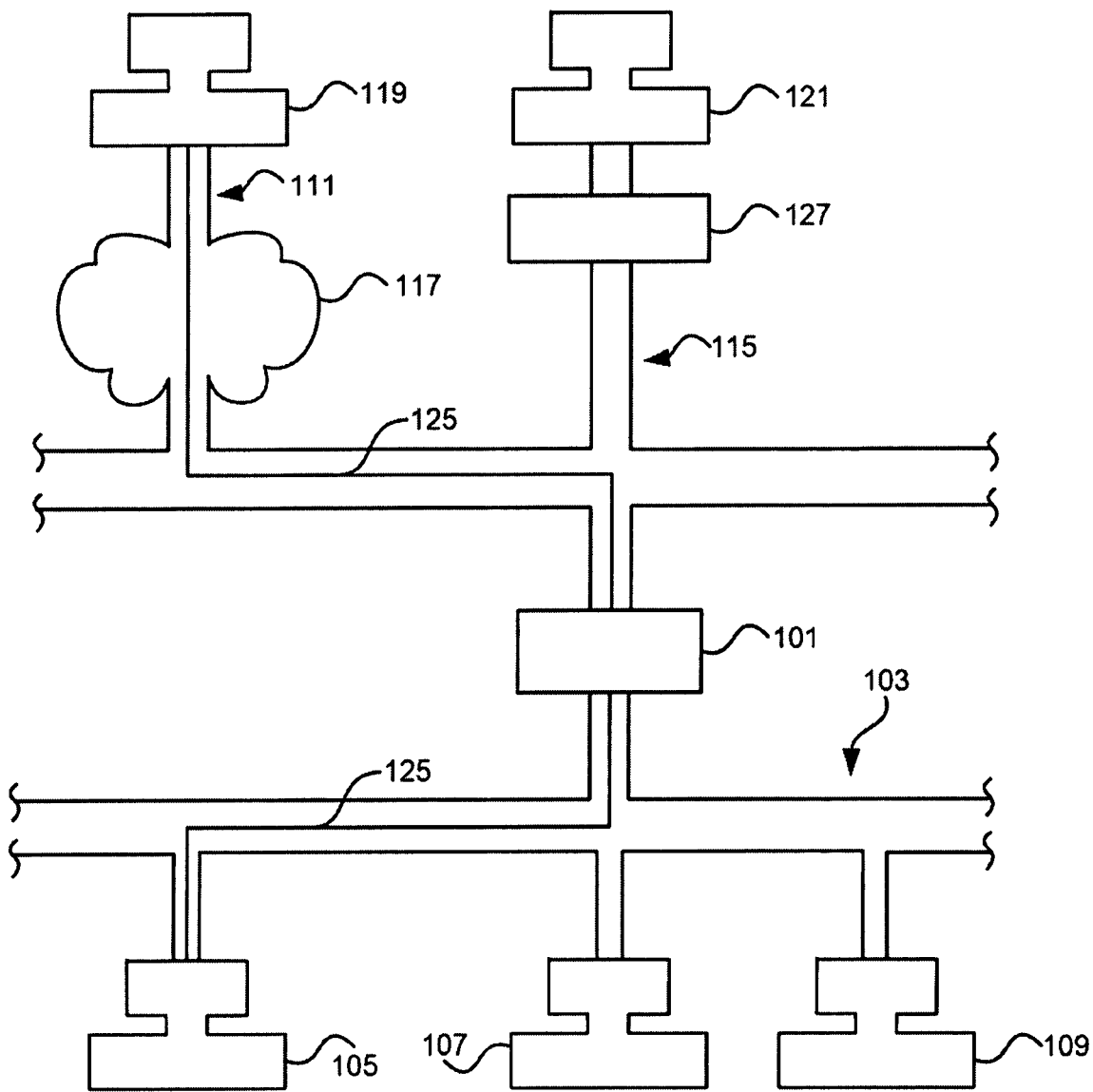
FIG. 1 is a schematic illustration of a conventional communication network.
Figure 2:
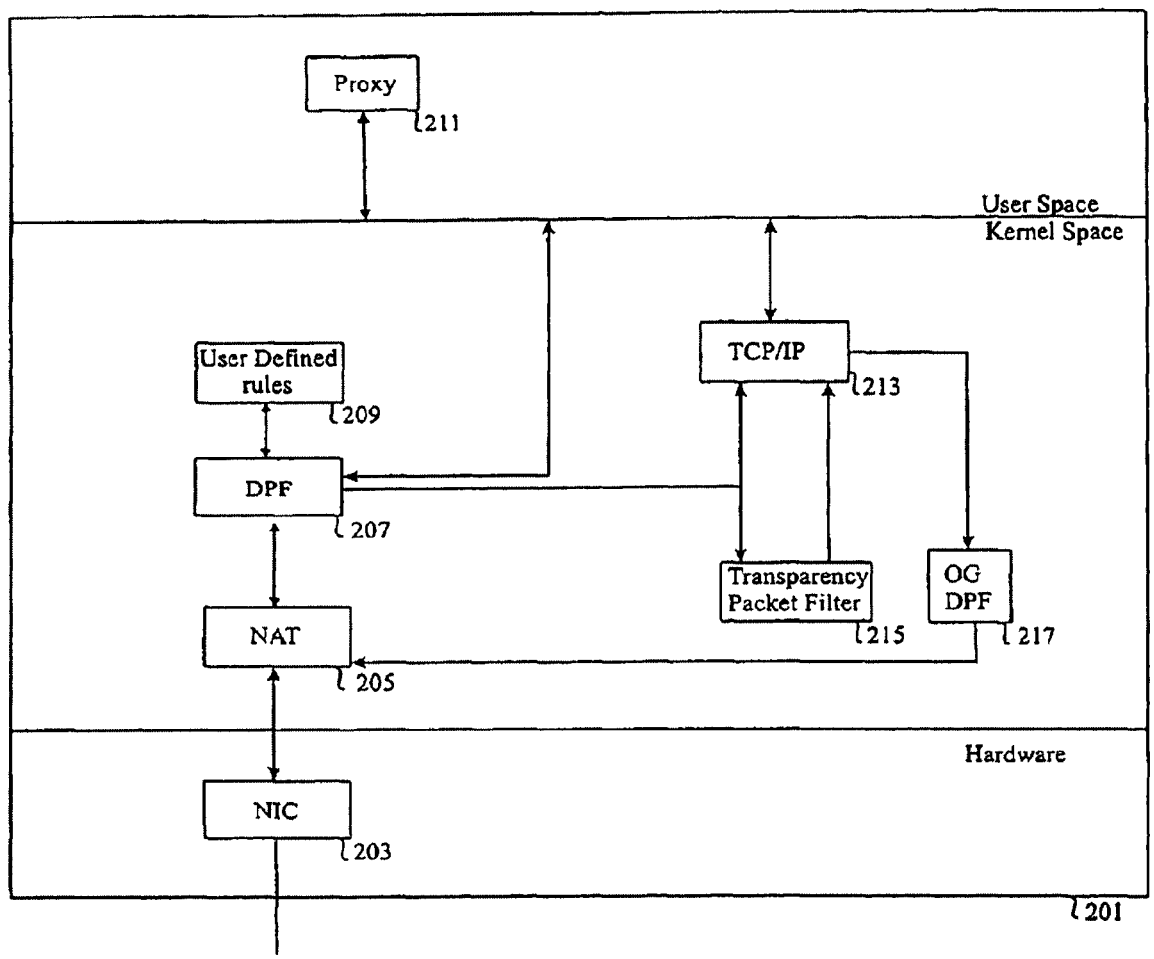
FIG. 2 is a schematic illustration of internal modules of the firewall of the present invention.

Referring to FIG. 2, there is illustrated an overall block diagram of a firewall 201 of the present invention that includes a Network Interface Card (NIC) 203 coupled to at least one outside network. NIC 203 is also coupled to a Network Address Translation module (NAT) 205 which in turn is coupled to a Dynamic Packet Filter module (DPF) 207. DPF 207 is coupled to a proxy 211, a User Defined Static Packet Filter module (UD-SPF) 209, Transparency Packet Filter (TPF) 215, and a local Transmission Control Protocol/Internet Protocol stack (TCP/IP) 213. TCP/IP 213 in turn is coupled to an Out-Going Dynamic Packet Filter (OG-DPF) 217.

It should also be noted that the term "coupled" should be interpreted to mean one of many connection methods. For instance, NIC 203 may be coupled to the at least one outside network via wire or wireless communication connections, whereas NIC 203 may be coupled to NAT via physical wires. However, when two coupled modules are implemented in computer programs, the term coupled means data transfer between the two computer program modules during execution thereof. In other words, the term "coupled" means a connection established through at least one of wireless communication links, wire connections and computer program data transfers.

NAT 205, DPF 207, UD-SPF 209, TPF 215, local TCP/IP 213 and OG-DPF 217 are located in the kernel space of firewall 201. Here, the term kernel designates the operating system in a computer that contains the system-level commands hidden from the user. For example, the kernel may include device drivers; memory management routines, scheduling programs, and other system calls. The kernel always runs while the system is operating. Proxy 211 is located in the user space, i.e., the application layer, of firewall 201. The term proxy designates either all of the filtering and decision making processes or individual filtering processes occurring at the user space. Proxy 211, therefore, can be referred as a one process or a plurality of processes depending upon the context in which the term appears.

Preferably, the preceding components in the kernel space and user space are implemented in computer programs written in C or C++. Alternatively, the computer programs can be written in other computer languages such as Pascal. The computer programs are also implemented to run on a variety of computer operating systems such as UNIX, Windows NT or LINUX. It should be noted that the computer language and the corresponding operating system are not essential part of this invention; therefore, the invention disclosed herein can be implemented in any computer language and operating system.

The computer programs are stored in a computer readable storage medium, e.g., hard disks or floppy diskettes. In operation, the computer programs are read to a random access memory to be executed by a processor. The computer readable storage medium, the random access memory and the process are preferably included in the computer of firewall 201. Alternatively, however, the computer readable storage medium can be provided by another computer or floppy diskettes. Hence, the computer programs can be downloaded from a remote computer coupled to firewall 201.

Referring back to FIG. 2, preferably, firewall 201 can be part of a computer located between LAN and outside networks. NIC 203, also known as an adapter interface, is a hardware attachment, usually a computer expandable board, that connects firewall 201 to outside networks. Each physical connection established through NIC 203 is assigned to a port number so as to identify the physical connection.

The above described elements are further explained by way of steps that take place during operation therein. For instance, a plurality of packets from the outside networks arrives at NIC 203. Each received packet is examined separately by firewall 201. More specifically, when a packet is received by NIC 203 from any one of outside networks 111, 115, the packet is associated with a corresponding port number. The packet is, then, forwarded to NAT 205 which translates the destination address of the received packet into a corresponding address of internal hosts. The packet is then sent to DPF 207 for further examination and processing.

Figure 3:
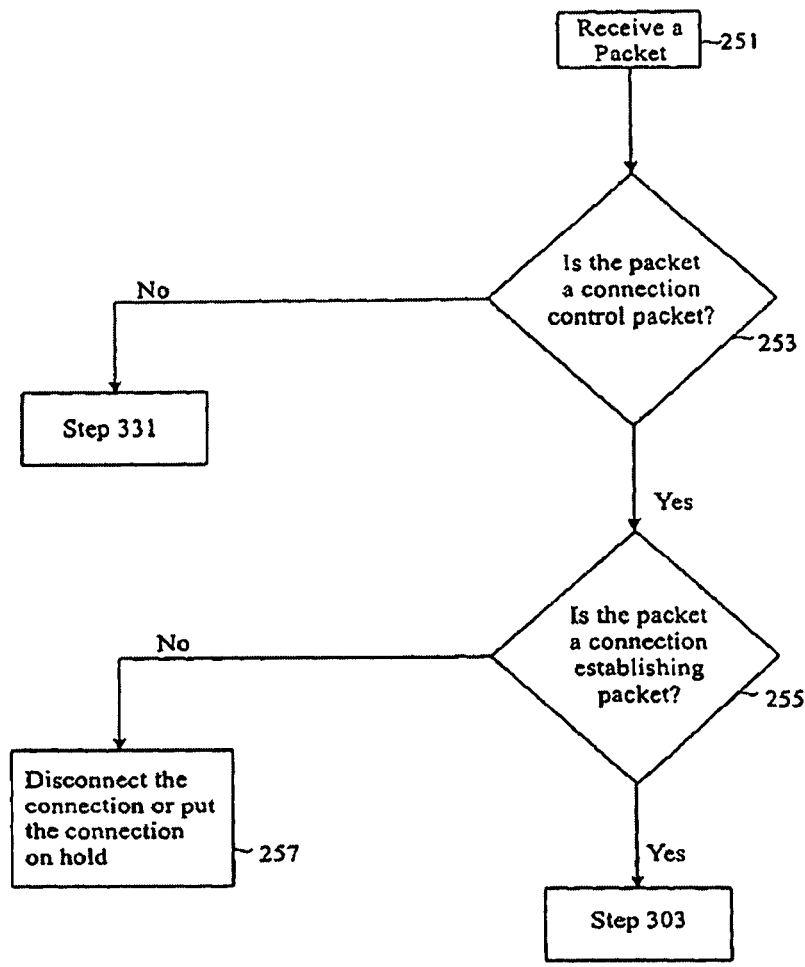
FIG. 3-6 are flow charts a plurality of functions performed by the firewall of the present invention.

Referring to FIG. 3, in step 253, DPF 207 determined whether the received packet is a connection control packet which requests to establish a data communication connection, disconnect an established connection, or put an established connection into a hold state. It should be noted that a physical connection between a source and destination connection does not establish a data communication connection. The connection is completely established only when the physical and data communication connections are achieved. In order to avoid any confusion, the physical communication connection is referred as a physical connection and a data communication connection is referred as a connection hereinafter. If the packet is a connection control packet, DPF 207 performs step 255; and if the packet is not a connection control packet, i.e., a data packet, then DPF 207 performs step 331.

In step 255, DPF 207 determines whether the received packet is a connection establishing packet, i.e., a SYN packet. If the packet is a connection establishing packet, DPF 207 performs step 303; and if the packet is not a connection establishing packet, DPF 207 performs step 257.

In step 257, DPF 207 performs the following: if the packet is a connection disconnecting packet, i.e., a FIN packet, the corresponding pre-existing connection is disconnected; and if the packet is a hold packet, i.e., an RST packet, then the corresponding pre-existing connection is put on hold.

Figure 4:
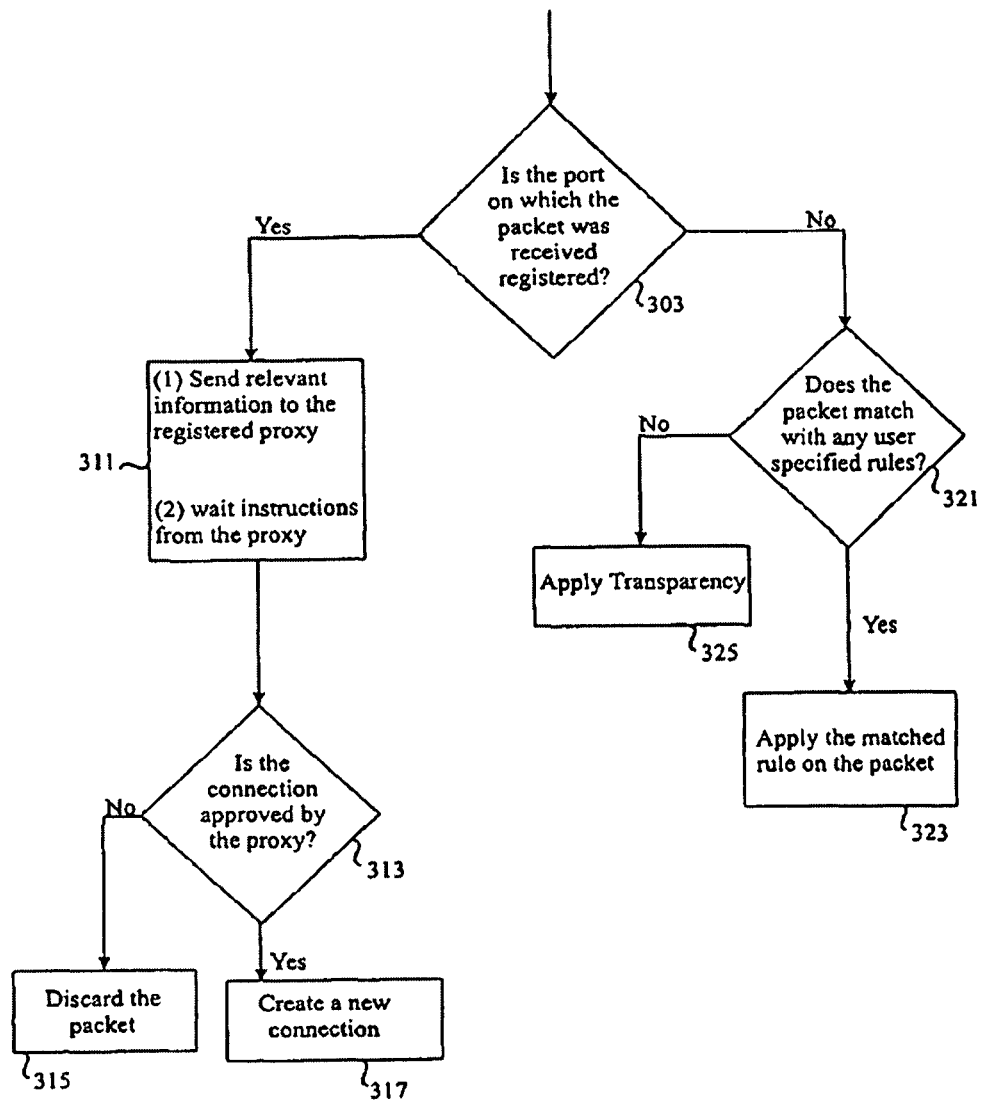

Referring to FIG. 4, in step 303, to be performed when the packet is a connection establishing packet, DPF 207 further determines whether the port, i.e., the port, on which the packet was received is a registered port. If the port is registered, DPF 207 performs step 311; and if the packet is not registered, DPF 207 performs step 321. The system administrator specifies which of the ports are to be registered in a configuration information file. For example, when physical connections are made between a remote host computer belonging to an outside network and a port on NIC 203, the system administrator makes security assessment of the remote host. Subsequently, the system administrator sets up the configuration information file setting forth whether to register that port.

In step 311, to be performed when the port is registered, DPF 207 transfers attribute information of the packet to proxy 211. Preferably, the attribute information includes the source and destination addresses of the packet and the port on which the packet was received. It should be noted, however, other information contained the connection establishing packet can be sent to proxy as well. Once the attribute information has been sent to proxy, DPF 207 awaits instructions therefrom.

Proxy 211, upon receiving the attribute information from DPF 207, determines whether to allow the connection. If the connection is to be allowed, proxy 211 further determines which filter dynamic filter rule to apply.

One such dynamic filter rule is a filter all rule. This rule is utilized when only packet filtering is required for all packets in a particular connection. For example, this rule could be defined to apply packet filters to all "telnet" packets.

Another dynamic filter rule is a selective filtering rule. This rule requires proxy 211 to handle connection control packets and packet filters to handle the data packets. In other words, the packet filtering will be enabled only when proxy 211 has performed it's security checks for the connections, i.e., checking the relevant information on the SYN packet sent by DPF 207. For instance, this rule is useful for protocols such as File Transfer Protocol (FTP), which sends data packets on a different connection after establishing the connection. Other filtering rules are also possible such as not applying any filtering or applying a proxy filter at the application layer to all packets received on a specific connection.

The configuration file discussed above, which stored the information on which ports are registered, further includes various filter rules to be applied for specific connections. For example, packets received from a particular port can be subjected to the filter all rule filter, while packets received from another port can be subjected to the selective filtering rule. The configuration file is preferably stored in the computer where firewall 201 is located. It should be noted, however, that the configuration file can be stored in any of internal hosts. It should also be noted that the system administrator creates the configuration information file discussed above and specifies the TPF rules by utilizing a graphical user interface configured receive appropriate information from the system administrator.

Once proxy 211 determines whether to allow the connection and which one of the rules to apply to the connection, that information is transferred to DPF 207.

In step 315, DPF 207 discards the packet if proxy 211 determined not to allow the connection. In step 317, DPF 207 creates a new connection and applies the corresponding rule. The rule will be applied to any subsequent packets from that connection until the connection is disconnected.

A new connection is created by modifying a connection list. The connection list, as the name implies, includes a list of currently active or soon to be active connections and relevant information thereof such as the source and destination addresses and the port on which the connection is or to be established. Each entry in the connection list represents TCP or UDP (User Datagram Protocol) connection. For instance, if the connection is allowed by proxy 211, the corresponding connection entry in the connection list is modified to indicate that the connection has been allowed and established.

In yet another aspect of the invention, since there are no SYN packets for UDP connections, if a UDP packet has previously established a connection and the connection exists in the connection list then that connection is used for new UDP packets received on the same connection. Other UDP packet processing steps are similar to the TCP packet processing steps described above.

Preferably, the communication between proxy 211 and DPF 207 describe above is achieved by using a socket. The following is a description of a specific implementation of the sockets. For instance, a new network protocol family and new functions can be added to a conventional socket API (Application Program Interface). Sockets provide a convenient and well known programming model to one of ordinary skill in the art.

Preferably, the following data structures are defined in a socket definition header file:

```
struct sockaddr_gt {
    u_short       sin_family;
    struct in_addr sin_addr;
    u_short       sin_port;
    u_char        proto;
    struct in_addr sout_addr;
    u_short       sout_port;
    u_char        sin_zero[1];
};
```

The above definition of struct is a structure in computer program language. A structure is a collection of one or more variables, possibly of different types, grouped together under a single name for convenient handling. It should be noted that structures are called "records" in some other computer languages, notably Pascal. The structures permit a group of related variables to be treated as a unit instead of as separate entities. This arrangement helps to organize complicated data, particularly in large computer programs.

The variable definitions such as u_short and u_char specify the length of corresponding variables to be unsigned short integer and unsigned character, respectively. These terms are well known to one of ordinary skill in the art of computer programming. The following is a brief description of the various fields in the struct sockaddr_gt:

sin_family

This variable field specifies the protocol family to which the struct sockaddr_gt belongs.

sin_addr

This variable field specifies a source IP address. For a connect function, sin_addr specifies the source IP address of a connection to be filtered. For a bind function, it specifies the IP address of an interface port to which the socket should be bound by the bind function. For an accept function, it specifies the source IP address of the SYN/UDP packet received by firewall 201. The connect, bind, and accept functions are discussed below.

sin_port

This variable field specifies a source port number, i.e., the interface port on which the packets are to be received. For the connect function, sin_port specifies the source port of a connection to be filtered. For the bind function, it specifies the destination TCP/UDP port number of SYN/UDP packets for which the proxy wishes to register via a listen function. For the accept function, it contains the source port number of the SYN/UDP packet received by the firewall. The listen function is discussed below.

proto

This variable field specifies the type of Internet Transport Protocol that must be Dynamic Packet Filtered. The only valid values for this variable are IPPROTO_TCP for TCP and IPPROTO_UDP for UDP.

sout_addr

This variable field specifies a destination IP address. For the connect function, sout_addr specifies the destination IP address of a connection to be packet filtered. For the accept function, it contains the destination IP address of the SYN/UDP packet received by the firewall.

sout_port

This variable field specifies the destination port number. For the connect function, sout_port specifies the destination port of a connection to be packet filtered. For the accept function, it contains the destination port number of the SYN/UDP packet received by the firewall.

sin_zero

This variable field specifies unused byte of data. This enables the use of padding to match the size of struct sockaddr.

Preferably, data_gt data structure defined below is used by the getsockopt function to retrieve DPF connection statistics.

```
struct data_gt {
    int  src_sent;
    int  dst_sent;
};
``` src_sent

This variable returns the number of bytes transferred by the source end of the connection.

dst_sent

This variable returns the number of bytes transferred by the destination end of the connection.

In order to fully discuss the new socket structure, the semantics of the various functions mentioned above is described below. As a starting point, the semantics of the functions is similar to the semantics of the various standard socket application calls for adaptive proxies and DPF. In other words, except for the data structure described above, the parameters to the functions are substantially similar to conventional socket interfaces such as the standard Berkley and Winsock socket interfaces.

socket(int domain, int type, int protocol)

This function creates an endpoint for communication. It opens a passive entry and returns a descriptor to the socket.

bind(SOCKET s, const struct sockaddr *name, int namelen)

The bind function assigns a name to an unbound socket created by socket. This causes the socket to be associated with the address specified in name. From the perspective of DPF 207, the bind function allows proxy 211 to register with a kernel/driver for packet filtering on a specific interface port number. Only the sin_family, sin_addr, and sin_port fields in name are used.

listen(SOCKET s, int backlog)

This function looks for connection requests, e.g., receiving a SYN packet, on a socket. The listen function requests that DPF 207 look for connection requests on the address and port specified by the name parameter supplied to the bind function. By invoking the listen function on a socket, proxy 211 registers with the kernel/driver so that proxy 211 will receive information about SYN/UDP packets arriving on the interface and the specified port. The accept function provides address information for the SYN/UDP packet.
accept(SOCKET s, struct sockaddr *addr, int *addrlen)

This function supplies attribute information about an incoming SYN/UDP packet to a registered proxy. When the accept function returns, the addr structure will contain the source and destination IP addresses and port numbers of the requested connection. The accept function returns a new socket descriptor that is mapped to this requested connection.
connect(SOCKET s, struct sockaddr *addr, int *addrlen)

The connect function allows proxy 211 to specify a DPF rule to the kernel/driver so that an entire connection is packet filtered (including the SYN/UDP packet). Proxy 211 in this case does not perform source or destination checks for the connection. The addr parameter should contain the source and destination IP addresses and port numbers and the protocol type of the socks descriptor bound to this connection. Proxy 311 should use this socket descriptor to perform any operations related to this connection.
setsockopt(SOCKET s, int Level, int OptionName, const char *Option Value, int OptionLen)

This function sets socket options. For example, this function can be used by proxy 211 to indicate to DPF 207 to filter the connection mapped to the socket descriptor. Following are valid values for the parameters to socket
getsockopt(SOCKET s, int Level, int OptionName, char *Option Value, int *OptionLen)

This function gets various socket options. For example, this function can be used by proxy 311 to retrieve the number of bytes of data transferred over a packet filtered connection.

As described above by way of data structures and functions utilizing the data structures, proxy 211 preferably utilizes the application level socket interface to interact with DPF 207 in the kernel. For instance, proxy 211 performs an "accept" to retrieve the information about an incoming SYN packet on the registered port. The information available about the SYN packet is the source and destination IP address and the port numbers. Subsequently, proxy 211 performs validation for the connection and if it decides to reject the connection request, then it closes the socket associated with that connection. This will cause a close request to be sent to the kernel which in turn will delete the pending connection entry and discard the SYN packet. If proxy 211 accepts the connection, then it uses the setsockopt function to inform the kernel to filter the connection.

DPF 207 requires two way communication between the kernel and proxy 211. The kernel needs to notify proxy 311 of the arrival of either a SYN, RST or a FIN packet. Proxy 211 then needs to inform the kernel as to whether to accept or reject the connection. Also, proxy 211 may need to request the kernel to open up a future connection request.

The following are more detailed steps of the communication between DPF 207 and proxy 211 using the above defined functions.

Kernel to Proxy Notification:
1. Send notification to proxy 211 on a SYN/FIN/RST packet arrival. Proxy 211 can register events with the kernel and the kernel can notify proxy 211 when the event occurs.

Proxy to Kernel Interfaces
1. Register with the kernel for DPF 207, using the bind function.
2. Request for SYN packet information, using the listen function.
3. Retrieve information about the received SYN packet, using the accept function.
4. Inform the kernel to allow filtering a connection request, using the setsockopt function.
5. Inform the kernel to close DPF 207 connection using closesocket function.
6. De-register proxy 211 for DPF 207 with the kernel using closesocket function.
7. Retrieve the number of bytes transferred during a connection (both ways) using getsockopt function.
8. Request the kernel to open up a future connection, using connect function.

The following table further describes the interactions and mappings of the socket interface to kernel functions on an NT platform:

| Application | Winsock | Kernel/Device Printer |
| --- | --- | --- |
| socket | create and return socket descriptor | NOP |
| bind | Bind a socket to a name. Creates a FileObject for the socket. | Associates the created FileObject with a Proxy Table Entry. (Registering the proxy for DPF). |
| listen | Creates a end-point FileObject, associates it with the transport FileObject created in bind and passes even handlers for connect, disconnect, error, receive to kernel. | Kernel saves the event handlers in the Proxy Table entry. Associates end-point FileObject with the transport FileObject. |
| accept | NOP | NOP |
| setsockopt | Passes the socket options to the kernel. | Filter connection. |
| connect | Creates end-point FileObject and if socket has no name, creates a transport FileObject. Sets even handlers for disconnect error, receive. | Associate end-point and transport FileObjects. Create connection entry. |
| getsockopt | Passes the memory to the kernel to retrieve the socket options. | Return the appropriate options |
| getsockname | Passes the memory to the kernel to retrieve the socket port/IP address. | Return the port/IP address of the connection initiator (for connect sockets). For bind/listen sockets returns port/IP address on which proxy is listening. |

-continued

| Application | Winsock | Kernel/Device Printer |
|---|---|---|
| closesocket | close the FileObject. | Delete the entry from the connection map or proxy table approximately. |

It should be noted that the above described program functions and associated data structure formats are implemented in computer programs such as C or C++. Alternatively, the computer programs can be written in other computer languages such as Pascal.

Referring back to FIG. 4, in order to continue on with the description of steps that take place during operation of firewall 201, in step 321, DPF 207 determines whether the packet matches with any of user specified rules. (This steps is performed when the port on which the communication establishing packet was received is not registered.) Whether the packet matches a user specified rule is determined by attribute information of the packet. The attribute information of the packet includes:

Source and destination computer addresses;
Source and destination transport layer protocol numbers;
Type of protocol (TCP, UDP etc.); and
Port numbers of NIC 203 on which the packet was received.

Anyone or a combination of the attributes can be utilized to determine if the packet matches with any user specified rules. Subsequently; if a user specified rule matches with the communication establishing packet, the matched rule is applied to the packet (step 323). If no user specified rule matches the packet, a transparency is applied (step 325).

The user specified rules 209 include user specified static filter rules and user specified dynamic filter rules.

Each entry in the user specified static filter rules includes the attributes discussed above and a value indicating the type of filter to apply to the packet. The types of filters include "permit" filter to forward the packet to its destination, "deny" to discard the packet, "absorb" to apply an application level filter and "a filter all rule" discussed above. In order to provide a finer granularity in the packet filtering, the packet filter of the present invention is extended to include additional fields such as:

(1) TCP flags (SYN, SYN-ACK, URG/PUSH) are provided to block new TCP connections from a certain host, but continue to allow packets of existing connections by adding a filter rule to deny SYN packets from the host; and (2) Unlike the conventional packet filter rules which only allow a single port to be specified in a rule, the present invention is also configured to allow/deny connections to a particular interface port range. For example, connections to X terminal ports can be denied by specifying a filter rule with the range of X terminal ports specified.

The user specified dynamic filter rules are defined in the configuration information file. In other words, proxy 211 may add an explicit dynamic rule, as discussed above, even before a connection is established. This is useful when proxy, or the user, has performed filtration or validation of the physical connection, i.e., between a source and destination, then the connection can be allowed without waiting to receive a connection establishing packet In this case, when a connection disconnecting packet is arrived, DPF 207 handles it in accordance with the procedure discussed above.

Figure 6:
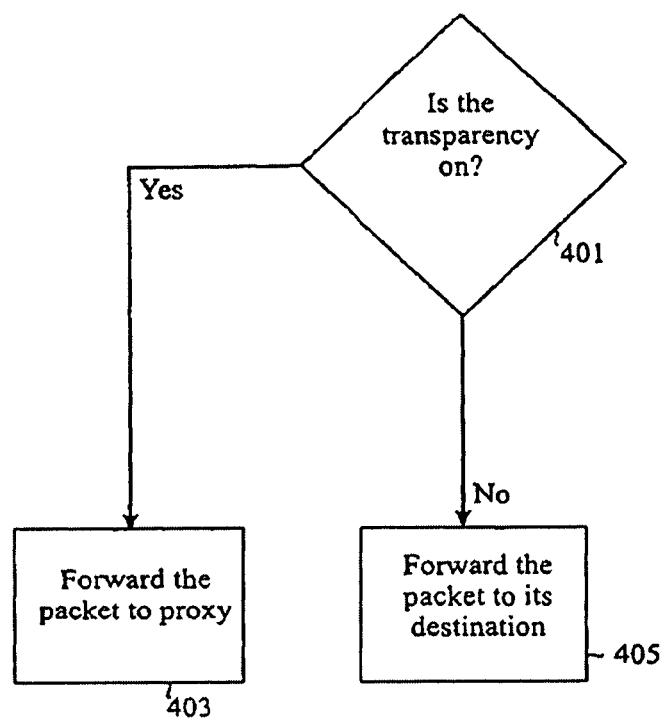

Now referring to the transparency procedure in step 401 of FIG. 6, DPF 207 determines if the transparency for the port on which the packet was received is on. If the transparency is on, the packet is sent to TPF 215. In this case, the packet is eventually forwarded to proxy 211 to be filtered at the application layer level. If the transparency is off, the packet is sent to its destination. For instance, if the destination is firewall 201, the packet is sent to proxy 211; and if the destination is an internal host computer, the packet is sent to the internal host.

The above procedure for transparency is provided because DPF 207 simulates a conventional proxy filter. In other words, the transparency option is also provided to the packets not forwarded to TPF 215. More specifically, the transparency is applied to both incoming and outgoing packets similar to packets to/from the conventional proxies.

For incoming packets, if the packet was part of a connection, i.e., not a SYN packet, if it was to be forwarded to firewall 201 and if transparency is OFF on the port on which it was received, then the packet's destination address is modified with the real destination, i.e., the address of an internal host computer which the packet is to be sent. It is an error if transparency is ON and the packet's destination address was not firewall 201 and there was no user specified filter rule matching the packet.

For outgoing packets, if the packet belonged to a connection and if transparency was OFF on the outgoing port, then the packets source address is modified with the firewall address of the outgoing port.

Figure 7:
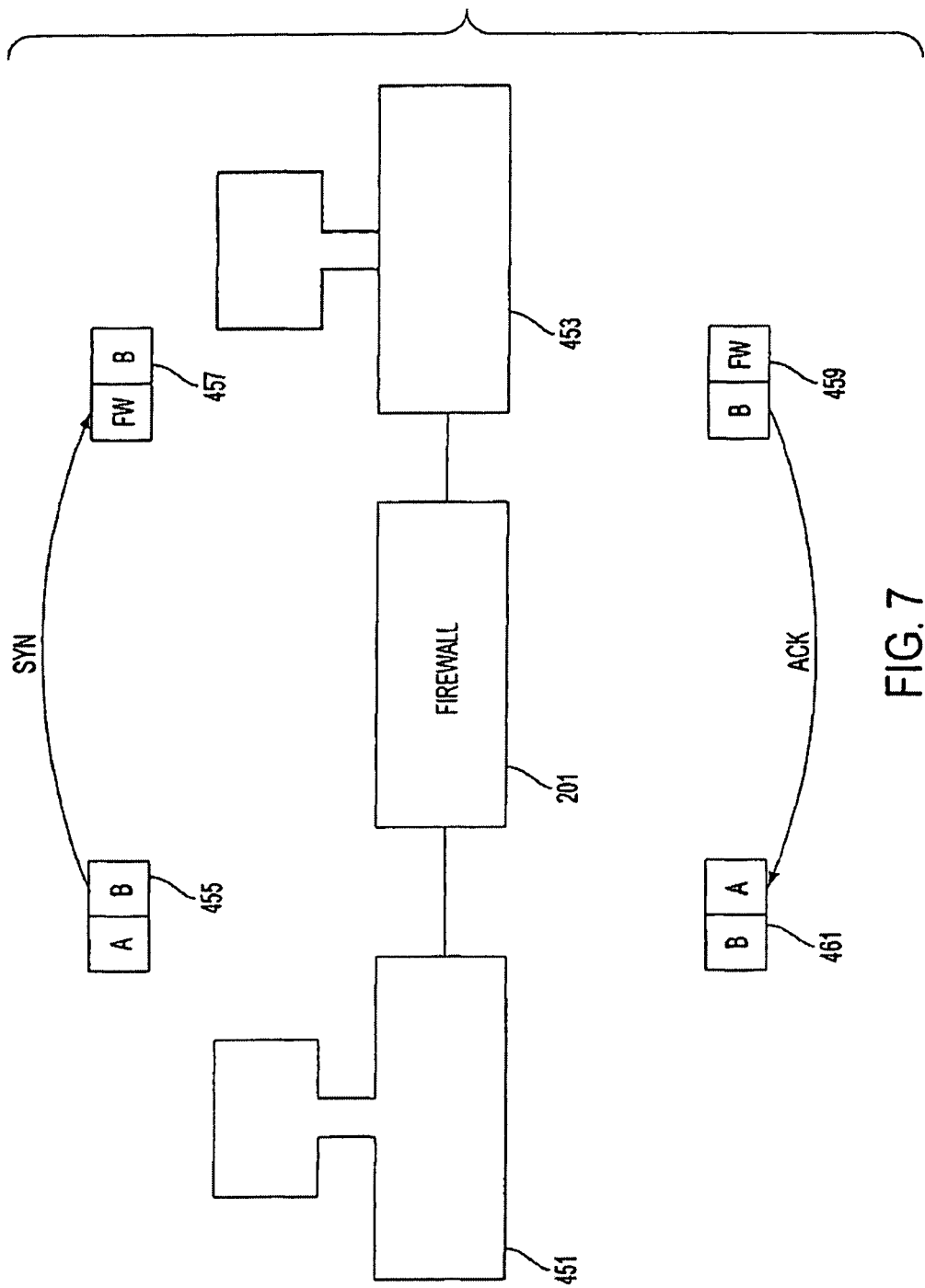
FIG. 7 is a schematic illustration of the transparency function of the present invention.

Referring to FIG. 7 which illustrates example procedures for transparency, when an internal host computer 451 having an address of A initiates a data communication connection to an external host computer 453 having an address of B, a connection establishing packet with A/B address is sent to firewall 201. At firewall 201, when the transparency is off, the source address is modified to reflect the IP address of firewall 201, and the packet is forwarded to external host 453. In response to the packet, external host 453 forwards an acknowledging packet, i.e., an ACK packet, having an address of B/FW. Upon receiving the packet, the address of the received packet is modified to be B/A because the transparency is off. It should be noted that when the transparency is on, as discussed above, the packet is absorbed into firewall 201 for further processing.

Figure 5:
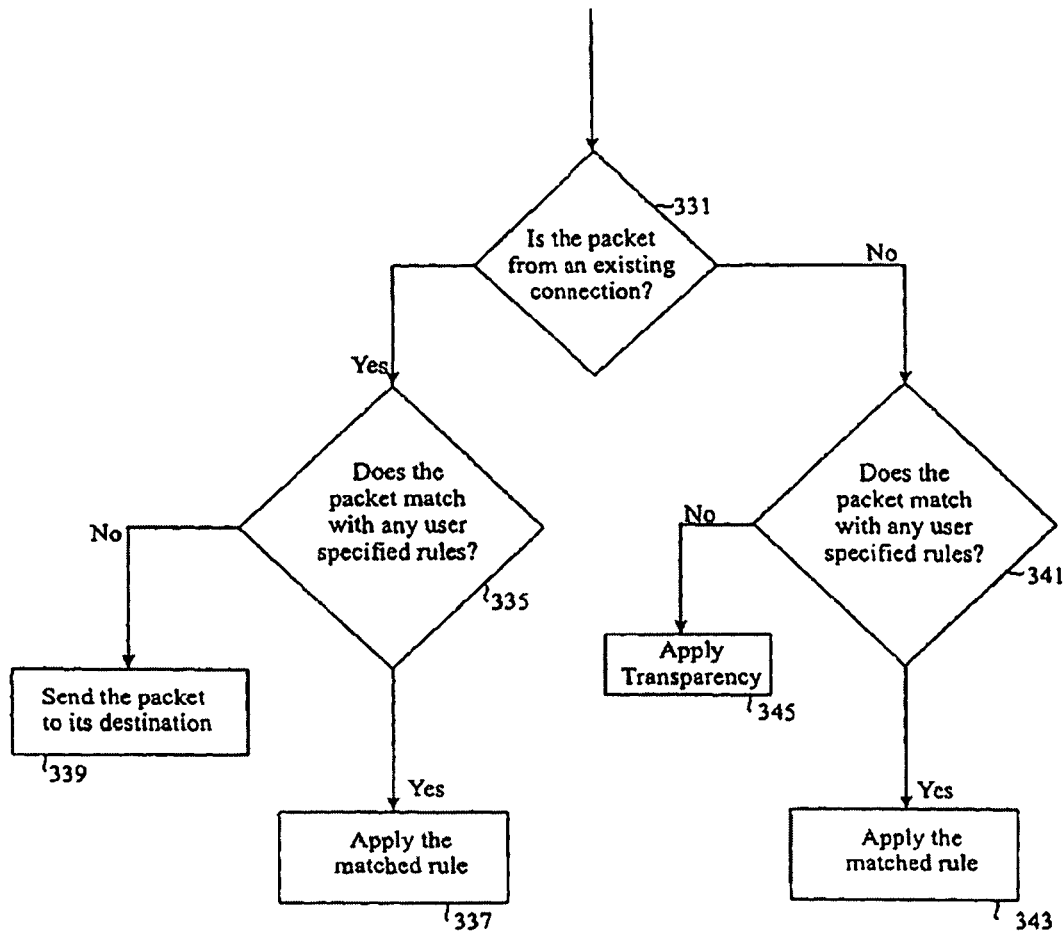

Now referring to FIG. 5 in order to discuss the remaining steps, in step 331, DPF 207 determines whether the received packet belongs to an existing connection. If the packet belongs to an existing connection, DPF performs step 335; and if the packet does not belong to an existing DPF connection, DPF performs step 341.

Whether a connection is established or not is determined by comparing the relevant connection information, i.e., the source and destination addresses and the port on which the packet is received, with the connection list discussed above.

Subsequent to step 335, DPF 207 determines whether a user specified rule matches to the packet. If a user specified rule matches the packet, the rule is applied (step 337); and if no user specified rule matches the packet, the packet is sent to its destination (step 339).

In step 341, DPF 207 determines whether a user specified rule matches the packet. If a user specified rule matches the packet, the rule is applied (step 343); and if no user specified rule matches the packet, the transparency is applied (step 345). The transparency step is discussed above in FIG. 6.

Referring back to FIG. 2, an outgoing packet is forwarded to OG-DPF 217. If the outgoing packet is an out-going connection establishing packet from one of the internal host commuters, the interface port on which the packet is leaving is saved in the connection list. This step allows DPF 207 to match future received packets belonging to that connection.

It should be understood that various modifications will be readily apparent to those skilled in the art without departing from the scope and spirit of the invention. Accordingly, it is not intended that the scope of the claims appended hereto be limited to the description set forth herein, but rather that the claims be construed as encompassing all the features of patentable novelty that reside in the present invention, including all features that would be treated as equivalents thereof by those skilled in the art to which this invention pertains.

What is claimed is:

1. A method of providing security to a computer network, comprising:
   receiving a connection establishing packet from an outside network through a physical communication connection between the computer network and the outside network, wherein the connection establishing packet is configured to establish a data connection between the computer network and the outside network and wherein packets of the data connection includes header information and content information;
   determining whether the port number on which the connection establishing packet was received is a registered port based on ports specified to be registered in a configuration information file;
   when the port number is registered:
      providing attribute information of the connection establishing packet to a proxy, wherein the attribute information comprises the source address, the destination address, and the port number on which the connection establishing packet was received;
      determining, using the proxy, whether to allow the data connection based on the attribute information;
      in response to determining the data connection is to be allowed:
         determining which one of at least two levels of security to apply based on the attribute information, the two levels of security comprising a first level of security which examines the content information of data packets at an application layer and a second level of security which examines the data packets excluding the content information therein at a network layer based on the attribute information of the connection establishing packet, thereby providing an appropriate level of security to the computer network; and
         when the first level of security is determined to be applied, applying a filter of the first level of security at the application layer examining the content information of all additional data packets received from the data connection subsequent to the connection establishing packet;
   when the port number is not registered:
      determining whether to apply a filter of the first security level or a filter of the second security level to the connection establishing packet based on the attribute information of the connection establishing packet;
      when the decision by the determining step is to apply the filter of the second level of security, then applying the filter of the second level of security to the connection establishing packet;
      when the decision by the determining step is to apply the first filter of the second level of security, then applying the filter of the first level of security to the connection establishing packet; and
      when neither filter is to be applied, then apply a transparency packet filter to the connection establishing packet to provide network security, wherein the transparency packet filter replaces an Internet Protocol (IP) address of a host on an internal protected network with another IP address for the connection establishing packet.

2. The method of claim 1 further comprising:
   determining whether the port number on which the connection establishing packet was received is a registered port based on ports specified to be registered in a configuration information file;
   wherein the providing of the attribute information to the proxy is performed when the physical connection through which the connection establishing packet was received is registered.

3. The method of claim 2 further comprising:
   when the data communication connection is determined to be allowed, then
   establishing a data communication connection between the computer network and the outside network.

4. The method of claim 3 further comprising:
   when the second level of security is determined to be applied, applying a filter of the second level of security to any additional packet received through the data connection subsequent to the connection establishing packet.

5. The method of claim 3 further comprising:
   disconnecting the data communication connection when a packet configured to disconnect the connection is received through the physical connection.

6. The method of claim 2 further comprising:
   discarding the connection establishing packet when the connection is not approved.

7. The method of claim 1 further comprising:
   receiving a further packet that is not a packet configured to establish a communication connection between the computer network and the outside network,
   if the physical connection through which the further packet was received has established a data communication therethrough, then
   determining whether to apply a filter of the first level of security or a filter of the second level of security to the further packet based on attribute information of the physical connection, wherein the attribute information of the physical connection includes an interface port on which the further packet was received, a destination address, and a source address of the further packet.

8. The method of claim 7 further comprising:
   if the decision by the determining step is to apply the filter of the first level of security, then applying the filter of the first level of security to the further packet;
   if the decision by the determining step is to apply the filter of the second level of security, then applying the filter of the second level of security to the further packet; and
   if the decision by the determining step is not to apply the filter of the first level of security and not to apply the filter of the second level of security, then forwarding the further packet to its destination.

9. The method of claim 1 further comprising:
receiving a further packet that is not a packet configured to establish a communication connection between the computer network and the outside network, and
if the physical connection through which the further packet was received has not established a data communication therethrough, then
determining whether to apply a filter of the first level of security or a filter of the second level of security to the further packet based on attribute information of the physical connection, wherein the attribute information of the physical connection includes an interface port on which the further packet was received, a destination address, and a source address of the further packet.

10. The method of claim 9 further comprising:
if the decision by the determining step is to apply the filter of the second level of security, then applying the filter of the second level of security to the further packet;
if the decision by the determining step is to apply the filter of the first level of security, then applying the filter of the first level of security to the further packet; and
if neither filter is to be applied, then apply a transparency packet filter to the further packet to provide network security.

11. One or more non-transitory computer-readable media comprising one or more instructions for a computer security program configured to provide security to a computer network, that when the instructions are executed by a processor operable to perform operations comprising:
receiving a connection establishing packet from an outside network through a physical communication connection between the computer network and the outside network, wherein the connection establishing packet is configured to establish a data connection between the computer network and the outside network and wherein packets of the data connection includes header information and content information;
determining whether the port number on which the connection establishing packet was received is a registered port based on ports specified to be registered in a configuration information file;
when the port number is registered:
providing attribute information of the connection establishing packet to a proxy, wherein the attribute information comprises the source address, the destination address, and the port number on which the connection establishing packet was received;
determining, using the proxy, whether to allow the data connection based on the attribute information;
in response to determining the data connection is to be allowed:
determining which one of at least two levels of security to apply based on the attribution information, the two levels of security comprising a first level of security which examines the content information of data packets at an application layer and a second level of security which examines the data packets excluding the content information therein at a network layer based on the attribute information of the connection establishing packet, thereby providing an appropriate level of security to the computer network; and
when the first level of security is determined to be applied, applying a filter of the first level of security at the application layer examining the content information of all additional data packets received from the data connection subsequent to the connection establishing packet;
when the port number is not registered:
determining whether to apply a filter of the first security level or a filter of the second security level to the connection establishing packet based on the attribute information of the connection establishing packet;
when the decision by the determining step is to apply the filter of the second level of security, then applying the filter of the second level of security to the connection establishing packet;
when the decision by the determining step is to apply the first filter of the second level of security, then applying the filter of the first level of security to the connection establishing packet; and
when neither filter is to be applied, then apply a transparency packet filter to the connection establishing packet to provide network security, wherein the transparency packet filter replaces an Internet Protocol (IP) address of a host on an internal protected network with another IP address for the connection establishing packet.

12. The one or more non-transitory computer-readable media of claim 11 wherein the operations further comprises communicating between the application layer and the network layer through a socket interface configured to send information therebetween.

13. The one or more non-transitory computer-readable media of claim 12 wherein the operations further include providing a bind function for registering the application layer to a physical connection between the computer network and the at least one outside network.

14. The one or more non-transitory computer-readable media of claim 13 wherein the operations further include providing a listen function for looking, in the kernel space, for the connection establishing packet configured to establish the data communication through the registered physical connection.

15. The one or more non-transitory computer-readable media of claim 14 wherein the operations further include providing an accept function for forwarding, in the kernel space, the attribute information of the connection establishing packet configured to establish the data communication through the registered physical connection.

16. The one or more non-transitory computer-readable media of claim 15 wherein the operations further include providing a connect function for establishing a data communication connection between the computer network and at least one of outside networks based on the attribute information compared with a configuration information file.

17. The one or more non-transitory computer-readable media of claim 16 wherein the operations further include providing a close socket function for disconnecting the data communication connection when a packet configured to disconnect the data connection is received therethrough.

18. A firewall for providing security to a computer network by filtering packets including header information and content information, comprising:
a processor;
a first filter in an application layer configured to filter its input packets by examining content information therein;
a second filter in a network layer configured to filter its input packets by examining the header information without examining the content information therein; and a third filter coupled to the first and second filters and configured to receive a plurality of packets arriving at the firewall, wherein the third filter is further configured to:
  forward the plurality of packets to one of the first and second filters, thereby providing security to the computer network;
  receive a connection establishing packet from an outside network through a physical communication connection between the computer network and the outside network, wherein the connection establishing packet is configured to establish a data connection between the computer network and the outside network;
  determine whether the port number on which the connection establishing packet was received is a registered port based on ports specified to be registered in a configuration information file;
  when the port number is registered:
    forward attribute information of the connection establishing packet, wherein the attribute information comprises the source address, the destination address, and the port number on which the connection establishing packet was received;
    determine whether to allow the data connection based on the attribute information;
    in response to determining the data connection is to be allowed:
      determine which one of at least two levels of security to apply based on the attribution information, the two levels of security comprising a first level of security which examines the content information of data packets at the application layer and a second level of security which examines the data packets excluding the content information therein, the network layer based on the attribute information of the connection establishing packet, thereby providing an appropriate level of security to the computer network; and
    when the first level of security is determined to be applied, apply a filter at the application layer examining the content information of all additional data packets received from the data connection subsequent to the connection establishing packet;
  when the port number is not registered:
    determining whether to apply a filter of the first security level or a filter of the second security level to the connection establishing packet based on the attribute information of the connection establishing packet;
    when the decision by the determining step is to apply the filter of the second level of security, then applying the filter of the second level of security to the connection establishing packet;
    when the decision by the determining step is to apply the first filter of the second level of security, then applying the filter of the first level of security to the connection establishing packet; and
  when neither filter is to be applied, then apply a transparency packet filter to the connection establishing packet to provide network security, wherein the transparency packet filter replaces an Internet Protocol (IP) address of a host on an internal protected network with another IP address for the connection establishing packet.

\* \* \* \* \*